United States Patent [19]

Simmons

[11] Patent Number: 5,360,220
[45] Date of Patent: Nov. 1, 1994

[54] SNOWMOBILE SKI FLEXING APPARATUS

[76] Inventor: Verlin M. Simmons, 495 S. Main, Providence, Utah 84332

[21] Appl. No.: 88,411

[22] Filed: Jul. 1, 1993

Related U.S. Application Data

[63] Continuation of Ser. No. 988,820, Dec. 9, 1992, abandoned.

[51] Int. Cl.⁵ .............................................. B62B 17/02
[52] U.S. Cl. ...................................... 280/28; 280/602
[58] Field of Search .................. 280/21.1, 22, 845, 15, 280/26, 28, 28.14, 28.15, 28.16, 28.17, 16, 22.1, 602; 180/190

[56] References Cited

U.S. PATENT DOCUMENTS

| | | | |
|---|---|---|---|
| 514,469 | 2/1894 | Hurtubise | 280/28 |
| 780,149 | 1/1905 | Anderson | 280/28 X |
| 996,251 | 6/1911 | Jennings | 280/845 |
| 3,301,569 | 1/1967 | Broschart | 280/28.14 X |
| 3,643,979 | 2/1972 | Richards | 280/28 |
| 4,896,895 | 1/1990 | Bettosini | 280/607 |
| 5,083,809 | 1/1992 | Stampacchia et al. | 280/607 X |
| 5,145,201 | 9/1992 | Metheny | 280/28 X |
| 5,165,709 | 11/1992 | Jacques | 280/28 |

*Primary Examiner*—Brian L. Johnson
*Attorney, Agent, or Firm*—Alan L. Edwards; Thompson E. Fehr

[57] ABSTRACT

A snowmobile ski flexing apparatus comprises a flexible snowmobile ski with a curved front portion and a flexible elongate loop attached at a first end to the front portion of the ski and bending upward and rearward and then down upon the ski to abut it at a second end at approximately its midpoint. A retainer comprising a chain is secured at one end to the ski at its front portion, while its other end is slidably engaged to the loop, allowing the latter to move lengthwise relative to the ski. A tubular sleeve with rectangular cross-section circumscribes the loop near the second end thereof and allows sliding movement of the loop when the ski is flexed, allowing flexing of a large portion of the ski and acting as a shock absorber.

19 Claims, 5 Drawing Sheets

SNOWMOBILE SKI FLEXING APPARATUS

This is a continuation of copending application Ser. No. 07/988,820 filed on Dec. 9, 1992, and now abandoned.

FIELD OF THE INVENTION

The present invention concerns the field of skis used on snowmobiles or other vehicles to facilitate forward and lateral movement, and particularly the front portions of the skis which are first to contact objects in front of the snowmobile during operation.

BACKGROUND OF THE INVENTION

A snowmobile of conventional construction has a moving track, powered by an engine, which propels the snowmobile forward. Two skis operatively attached to the steering mechanism, operated by the rider, are situated in front of the track to keep the as the rider desires.

A conventional snowmobile ski is constructed of metal and attaches to the steering mechanism at approximately its midpoint. The ski has an upwardly curved forward portion for encountering obstacles and uneven terrain. A stiff loop, usually constructed of a metal rod, is attached to the top of the front end of the ski and is bent upwardly and then backwardly to attach to the top of the ski just to the rear of the point where the ski begins its upward curvature. Some loops attach somewhat forwardly of this point. The loop was originally designed to increase safety in snowmobile use by prevention of the forward portion of the ski from stabbing a person or object during forward movement. It also increases durability of the forward curved portion of the ski and is a convenient handle for moving the snowmobile, especially when the snowmobile is stuck in a snowdrift or the like. The loop is also useful for handling the ski when it is unattached to the snowmobile.

The loop acts as a continuation of the curvature of the forward portion of the ski and thus enhances its ability to handle bumps, or moguls, and obstacles such as sudden changes in terrain. The loop is generally attached to the ski by welding. Most skis also have bridges or bars running along their length for stability and strength.

This type of ski has been the standard for many years, but recently a new ski has been developed that is not constructed of metal but of flexible and resilient plastic. The newer ski is usually wider than the standard metal ski and also lighter. One of the disadvantages of the metal ski that the new plastic ski is designed to prevent is the damage to the ski and jarring of the rider from the encountering of unyielding obstacles during forward movement. A snowmobile with conventional metal skis attached accommodates bumps, moguls, washboard patterns, and trail ruts in that its curved forward portion, and for large bumps its loop, enables the ski to rise up and over the bump and continue on its way. The curved forward portion and loop are also helpful when encountering unexpected obstacles such as concealed rocks or logs.

Snowmobiles are very heavy relative to the surface areas of their skis and often travel at great velocities, such that when the ski hits a mogul or other obstacle it does so with great force, notwithstanding the curvature of its forward portion, and often suffers bending or other structural damage. The loop and bridges are designed in part to avoid such damage, but the ski is often considerably damaged nonetheless through sustained aggressive use. At the same time, the unyielding nature of the ski forces the rider to endure a bumpy and uncomfortable ride, though shock absorbers mitigate the situation somewhat.

The newer ski is made of plastic which, unlike metal, yields and flexes and thus better endures the shock of hitting bumps and ruts, both in terms of a smoother ride for the rider and less damage to the ski from bending and the like because the ski is able to momentarily deform to absorb the impact and spring to its original position owing to its flexibility and resiliency. Generally, some parts of the ski continue to be made of metal or similarly stiff material as required by their function, such as bolts and the like and the attachment piece of the ski to the snowmobile.

The plastic ski has a loop much like the metal ski except that in the former the forward part of the loop is attached to the bottom of the frontal portion of the ski and often extends beneath it a certain distance. The loop, as in the metal ski, curves upwardly and then rearwardly to an attachment point located approximately where the frontal curvature of the ski begins. The loop generally is constructed of the same type of plastic as the rest of the ski and is attached thereto by bolts or equivalent attachment means. Since the loop as well as the ski is constructed of flexible material, it allows the frontal curvature of the ski to flex slightly when encountering bumps, further enhancing the ski's ability to absorb the impact.

Other types of skis include one constructed of aluminum with a plastic skin disposed on its bottom for better performance.

Notwithstanding the improvements in the performance of the plastic ski over the metal ski, the snowmobile and rider still experience considerable jarring and damage from obstacles, especially during sustained rides at high velocity in rough terrain. Additionally, the high curvature required of the forward part of the ski, though it assists in handling obstacles, increases wind resistance and can interfere with handling of the snowmobile in close quarters. Most importantly, the high curvature limits the amount of ski material involved in the flexible motion of the forward part of the ski, lessening the shock absorbing characteristics.

OBJECTS AND SUMMARY OF THE INVENTION

It is therefore an object of the present invention to overcome the shortcomings of the prior art.

It is a further object of the invention to improve the ability of snowmobile skis to absorb the impact of obstacles encountered during operation.

It is a further object of the invention to arrange placement of a snowmobile ski loop to enhance flexibility of the ski.

It is a further object of the invention to take full advantage of the flexible materials currently being used in construction of snowmobile skis.

It is a further object of the invention to reduce the amount of curvature needed in the forward part of a snowmobile ski.

It is a further object of the invention to increase the amount of material involved in the flexible motion of the forward part of the ski when encountering bumps.

In accordance with an aspect of the invention, a snowmobile ski flexing apparatus for use with a flexible elongate ski having front and rear portions, the front portion being curved upwardly, comprises a flexible elongate loop having first and second ends, the first end being attached to the front portion of the ski and extending upwardly and rearwardly toward the rear portion of the ski, then downwardly toward the ski such that the second end is disposed adjacent the ski, and an attachment device mounted on the ski and operatively attaching the loop to the ski, the attachment device allowing the second end of the loop to move lengthwise relative to the ski.

Specifically, and in a preferred embodiment, a flexible snowmobile ski apparatus comprises: an elongate, flexible, planar snowmobile ski having an upwardly curved forward portion and a rearward portion; an attachment plate disposed on the ski approximately at its midpoint for attachment of the ski to a snowmobile; an elongate, flexible loop having a first end secured to the underside of the forward portion of the ski and curving around and over the forward end of the ski and back down to a second end disposed adjacent the attachment plate; an elongate flexible retainer pivotally attached at a first end to the forward portion of the ski and slidably attached at a second end to the loop; and a metal bracket comprising a tube having open front and rear ends mounted on the attachment plate and slidably engaging the loop near the second end thereof such that the loop slides lengthwise relative to the ski when the latter is flexed.

BRIEF DESCRIPTION OF THE DRAWINGS

These and other objects, aspects, and embodiments of the present invention will be described below with reference to the attached drawing figures, of which.

DETAILED DESCRIPTION OF THE INVENTION

Figure 1:
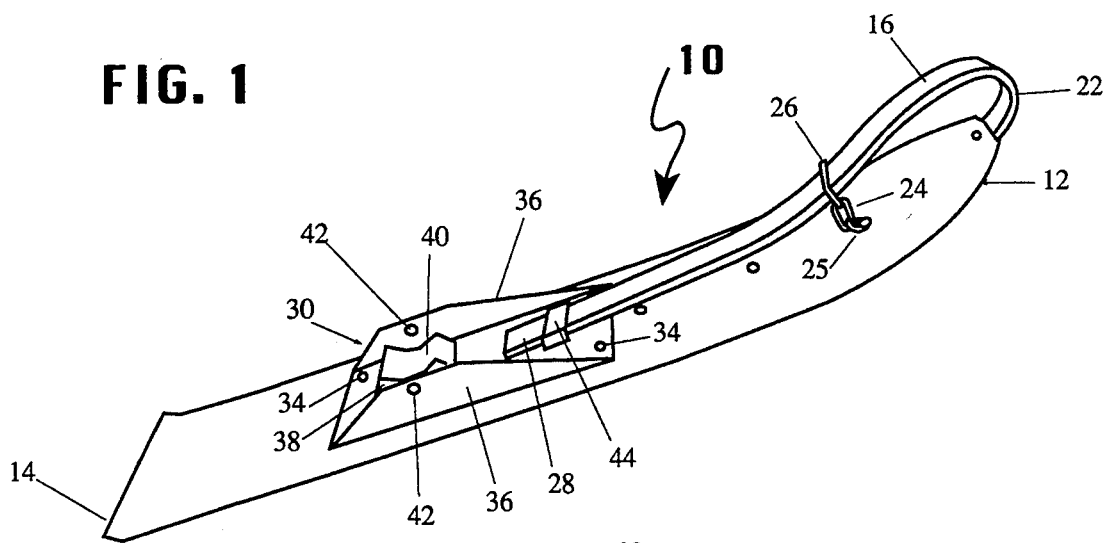
FIG. 1 is a perspective view of an example of a snowmobile ski according to the invention.
Figure 2:
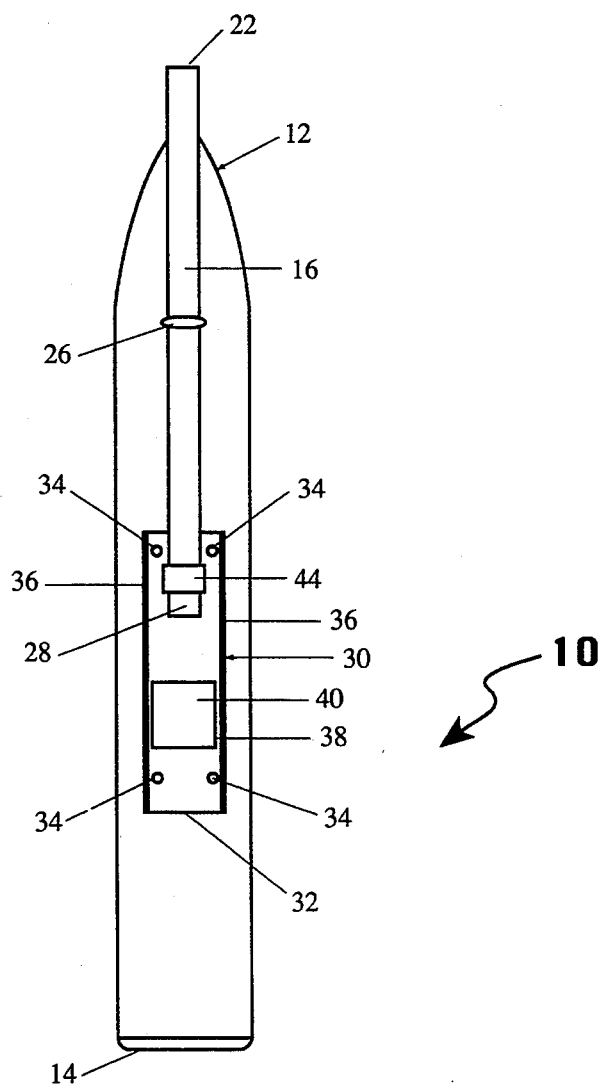
FIG. 2 is a top plan view of the snowmobile ski of FIG. 1.
Figure 3:
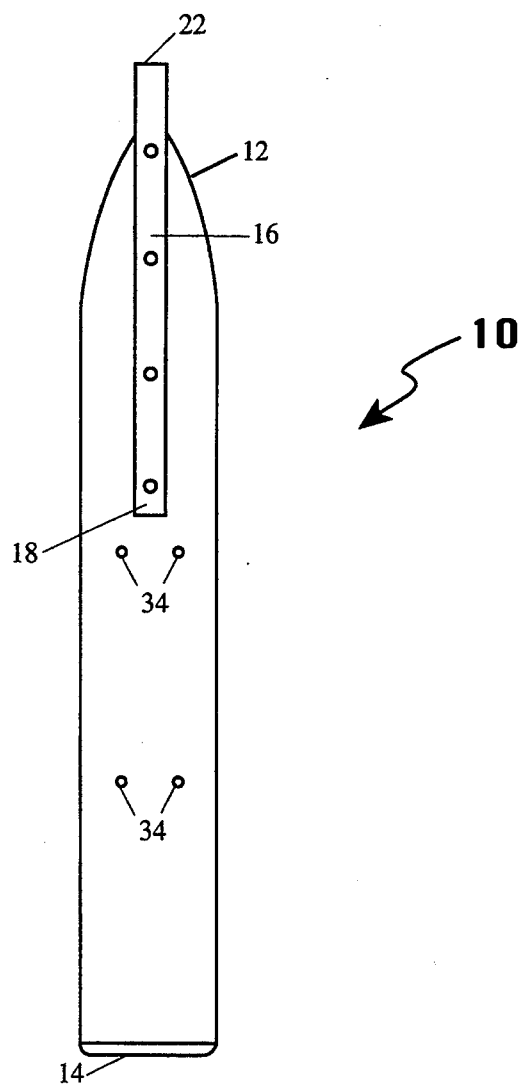
FIG. 3 is a bottom plan view of the snowmobile ski of FIG. 1.
Figure 4:
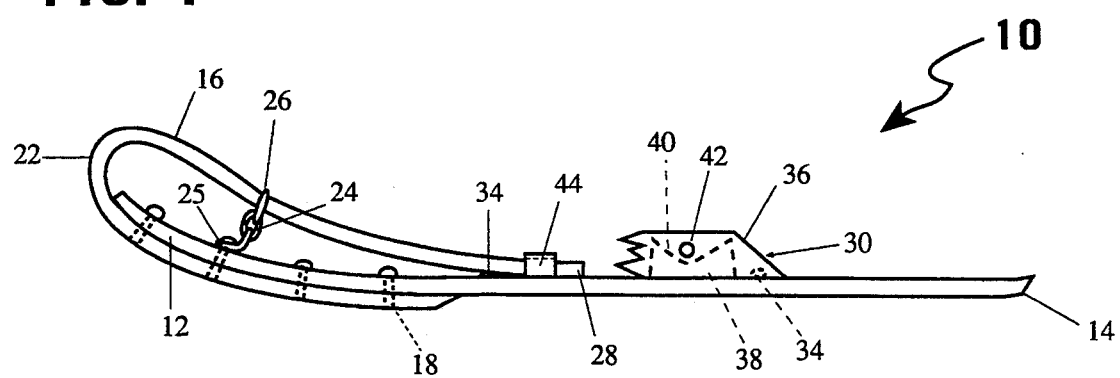
FIG. 4 is a side elevational view of the snowmobile ski of FIG. 1.

Referring first to FIGS. 1 to 4, an example of a snowmobile ski 10 according to the invention is shown. The ski 10 is curved upwardly at its front portion 12, and may also be curved slightly upwardly, or lipped, at its rear end 14 to allow for smooth passage when being pushed rearwardly or when backing down a hill and the like. The ski 10 is constructed of plastic, specifically UHMW type plastic, known in the art, and is approximately one-half inch thick, six inches wide, and 43 inches long in a preferred embodiment. The thickness may vary according to the materials used and the desired flexing characteristics of the ski 10. The ski 10 may alternatively be constructed of any other suitably strong, flexible, and resilient material such as varieties of urethane. The ski 10 may be injection molded with a mold containing the curved ends, or stamped from a prefabricated sheet with the ends subsequently shaped into curves, as desired by the manufacturer.

A loop 16, preferably constructed of the same plastic and approximately the same thickness as the ski 10, though its thickness and construction material may vary in the same way as the thickness and construction material of the ski 10, is formed from an elongate strip of material and bent or molded into a curved shape to accommodate the front portion 12 of the ski. The thickness of the loop may vary somewhat depending on the desired strength and conditions of use. In a preferred embodiment, a first end 18 of the loop attaches to the underside of the ski 10 approximately at the point where the curvature of the front end 12 meets the plane of the rest of the ski. The loop 16 bisects and attaches snugly to the underside of the ski from its first end 18 through the forward portion 12 of the ski and is secured adjacent thereto by bolts 20 or other suitable means such as adhesive.

The loop 16 extends upwardly from the front end 12 of the ski and forwardly a short distance to a frontal point 22, at which point it curves rearwardly back toward and ultimately onto the upper surface of the ski 10.

A retainer 24 is attached by a bolt or other means to the top surface of the ski 10, near its forward portion 12, and extends upwardly to slidingly engage the loop 16 such that the latter is free to move approximately horizontally through its engagement with the retainer 24. The retainer 24 in a preferred embodiment comprises a chain, the lowermost link 25 of which is bolted or otherwise secured to the ski 10, which extends upwardly to engage the loop 16. The topmost link 26 of the retainer which engages the loop 16 is flat on one side in order to accommodate the shape of the loop and allow its passage therethrough.

Other methods of sliding attachment to the loop can be used as alternatives. Additionally, the retainer 24 need not be a chain but can, for example, be a rod extending from the ski 10 to the loop 16, with suitable means of sliding (or fixed, as discussed below) attachment to the latter, and with pivotal or fixed attachment to the ski 10.

An advantage of pivotal or movable attachment of a flexible retainer to the ski 10 is that during flexing of the ski 10 the retainer 24 not only can accommodate and control the movement of the loop 16 by means of sliding movement of the loop through the topmost link 26 or other means of attachment, but also by pivoting on its attachment point to the ski and deforming to move with the movement of the loop 16 to allow some play in the latter. However, fixed attachment or rigid retainers will also work providing movement of the loop 16 is accommodated through the topmost link. By the same token, pivotal attachment of the retainer to the ski and loop will operate to accommodate limited flexation even without sliding movement of the loop 16 relative to the topmost link 26.

In a preferred embodiment, the retainer maintains the loop under pressure, such that without the retainer's engagement of the loop the latter would spring and curve upwardly to a greater degree than with the retainer. The retainer 24 itself is kept under tension by force exerted by the loop 16 and thereby is extended to its full length. In order to accomplish the tension between the loop 16 and the retainer 24 the length of the latter must be chosen to be short enough to pull the loop 16 downwardly from its natural path of curvature. The retainer 24 forces the loop 16 downwardly such that its second end 28 is disposed approximately parallel and adjacent with the top surface of the ski 10 for reasons that will become apparent hereafter. Apart from the considerations of tension and orientation of the second end 28, the size of the loop 16 and length of the retainer 24 can be chosen as desired by the user. Additionally, the ski can, if desired, be manufactured without a retainer with the loop being molded into the correct position or otherwise forced into it such that its second end 28 lies flat along the top of the ski. Methods for such molding will be apparent to those skilled in the art.

The principal reason for the retainer, apart from positioning, is to force the second end 28 of the loop 16 to move horizontally along the ski 10 when the forward part of the ski is flexed, in order to evenly distribute the bending and flexing of the ski over a much larger area of the forward portion of the ski than in prior art skis. Without a retainer as described herein or equivalent structure the ski bends mostly at a single point on its length, both reducing the shock absorbing qualities of the flexation and putting more stress and wear at that point of the ski. The retainer also allows for a relatively large degree of flexation or forgiving movement of the ski when bumps are encountered, but also controls it in a uniform and easily adjustable manner.

From the retainer 24 the loop 16 extends to and along the top of the ski 10 to its second end 28. The second end 28 is disposed within an attachment piece 30 by which the ski 10 is attached to the snowmobile. The attachment piece 30 preferably is constructed of a stiff material such as aluminum or other metal and comprises a rectangular flat bottom portion 32 secured to the top of the ski 10 by bolts 34 or other suitable means which are counter-sunk in the opposite side (bottom) of the ski. The attachment piece 30 has two side portions 36 which extend orthogonally from the lengthwise sides of the bottom portion 32 and which are trapezoid-shaped in a preferred embodiment, gradually rising from the front of the attachment piece 30 and ending in horizontal top and vertical rear portions.

A stabilizer 38, such as is known in the art, is attached to the bottom portion 32 of the attachment piece between the side portions 36 thereof and has a cutout portion 40 on its top to accommodate a rod (not shown) and other apparatus necessary for attachment to the snowmobile. Holes 42 in the side portions 36 of the attachment piece seat the rod in the attachment piece.

A three-sided retaining bracket or sleeve 44 is welded or otherwise attached to the bottom portion 32 of the attachment piece and circumscribes the loop 16 near the second end 28 thereof. The bracket 44 preferably is constructed of a stiff material such as aluminum or other metal and is mounted over the loop 16 near the second end 28 thereof with enough clearance to allow sliding movement of the loop 16 therethrough. Both the forward and rearward ends of the bracket 44 are open for passage of the loop. Approximately one inch of the loop 16 at the second end 28 protrudes through the rearward end of the bracket in the resting (unflexed) position of the ski. The amount of protrusion may be varied.

The flexible nature of the loop 16 and arrangement of the retainer 24 and bracket 44 provide for controlled flexation of the front portion 12 of the ski 10 (constructed, as mentioned above, of plastic or other flexible and resilient material) while encountering moguls, ruts, and to a limited extent abnormal obstacles such as rocks or logs, and spread out the flexation over a large part of the forward portion of the ski. When the ski 10 encounters a bump during forward movement, the bump will hit the forward portion 12 of the ski and exert rearward pressure on it. The forward portion 12 of the ski 10 will yield to the rearward pressure and flex rearwardly, causing the loop 16 to move rearwardly through the retainer 24 and the bracket 44. After the ski 10 moves over the bump the forward portion 12 of the ski, being resilient, springs back into position causing opposite movement of the loop 16 through the retainer 24 and bracket If desired, stops may be placed on the bracket 44 or other appropriate place to limit the movement of the loop 16 through the bracket, in either direction, and thus limit the flexation of the ski 10. The movement of the second end 28 of the loop 16 usually is small relative to the degree of flexation of the ski 10.

Through the present inventive apparatus, a relatively large range of flexation of the ski 10 is allowed, acting to smooth the ride of the snowmobile and lessen damage to the ski. It is additionally possible to lessen the curve of the front portion of the ski through the subject invention since the ski can accommodate larger obstacles through greater flexation of more total area on the ski. Lessening the curve of the front portion of the ski in itself also increases the ski material involved in flexing and the range of possible flexing. In general, the degree of curvature is inversely proportional to the flexing range of the ski.

Figure 5:
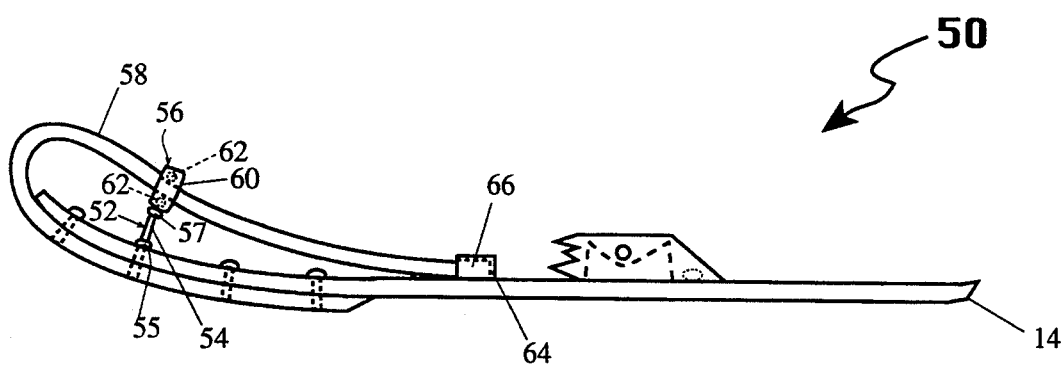
FIG. 5 is side elevational view of a second example of a snowmobile ski according to the invention.

Referring now to FIG. 5, a second example of a snowmobile ski 50 according to the invention is shown which utilizes as a retainer 52, instead of a chain, a rigid rod 54 bolted to the ski 50 at its bottom end 55, nonpivotally, and which has a roller assembly 56 attached to its top end 57 for sliding movement therein of the loop 58. The roller assembly 56 is bolted or welded to the top 57 of the rod 54 and comprises a housing 60 with upper and lower rollers 62 pivotally mounted by any suitable means in the housing 60 and which operatively contact the upper and lower surfaces of the loop 58, respectively, to accommodate movement of the latter therebetween by rotation of the rollers 62. Though attachments of the rod 54 to the roller assembly 62 may be pivotal, which would expand the range of flexation of the ski 50, they may be rigid, as shown.

Also shown in FIG. 5 is a backstop 64 disposed on the bracket 66, the backstop 64 comprising merely a closure plate attached to the rear portion of the bracket 66, which is all other respects is identical to the bracket 44 in FIGS. 1 to 4. The backstop 64 serves to limit the rearward movement of the loop 58 and thus the backward flexation of the ski 50. The bracket 66 is placed somewhat to the rear of the placement of the bracket 44 so that, unlike the latter, it covers the end of the loop in order to limit its movement by means of the backstop 64. Such a limiting apparatus may be desired, for example, to prevent an especially large obstacle from causing an undesirably great degree of flexation.

The bracket 66, as well as the bracket 44, may comprise any assembly which allows for sliding movement of the loop therethrough, and may comprise rollers or other devices to ease the movement of the loop.

Figure 6:
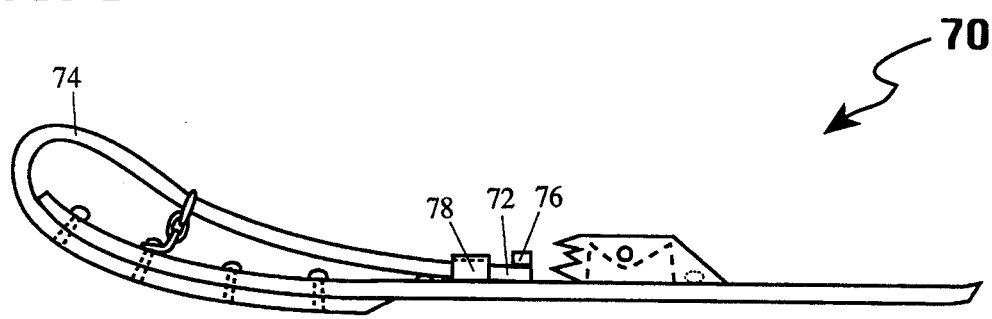
FIG. 6 is a side elevational view of a third example of a snowmobile ski according to the invention.

Referring now to FIG. 6, a third example of a snowmobile ski 70 according to the invention is shown which is the same as the ski 10 in FIGS. 1 to 4 in all respects except that the rearward end 72 of the loop 74 has a stop block 76 secured to it in order to limit forward movement of the loop 74 through the bracket 78 and thus limit forward flexation of the ski 70. Such a limiting device may be desired, for example, if backspring flexation of the ski is a problem. The stop block 76 is constructed simply by placing a piece of material of same construction and thickness of which the loop is made, on top of-the rearward end 72 of the loop and bolting or otherwise attaching it thereon. Other suitable constructions for a backstop will be apparent to those skilled in the art. In addition to limiting forward movement, the stop block 76 can also act as an easy way to adjust the height of the loop 74 by adjusting the position of the stop block 76 on the loop and thereby forcing more of the loop rearwardly through the bracket or allowing more of the loop forwardly through the bracket.

Figure 7:
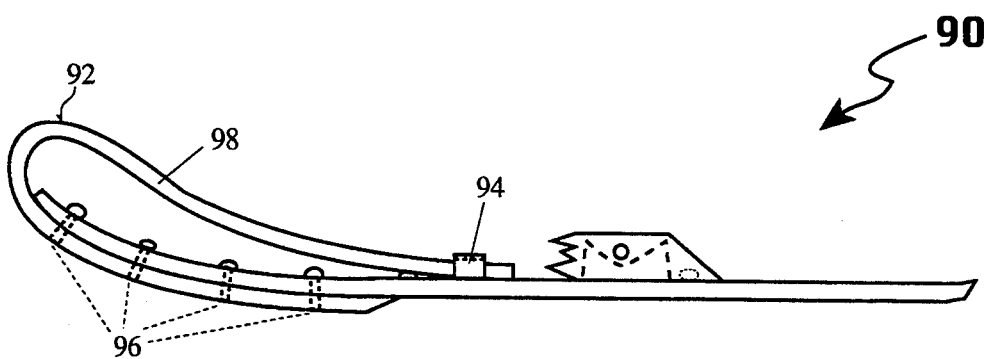
FIG. 7 is a side elevational view of a fourth example of a snowmobile ski according to the invention.

Referring now to FIG. 7, a fourth example of a ski 90 is shown which is identical in all relevant respects to the ski 10 in FIGS. 1 to 4 except that it lacks a retainer. In this example, the loop 92 is constrained in its movement solely by the bracket 94, its attachment to the ski 90 through the bolts 96, and the shape of the loop itself. The flexing of the ski 90 will cause corresponding flexation in the loop 92, but without a retainer to hold the middle portion 98 of the loop 92 down that portion will have a tendency in most circumstances to rise up during flexation, deforming the flat meeting of the loop 92 on the top of the ski in the vicinity of the bracket 94 and thus hamper the movement of the loop in the bracket. Nevertheless, molding and other manufacturing techniques such as the addition of other construction materials can stiffen the loop such that it slides satisfactorily in the bracket and thus eliminates the need for the retainer. If desired, the standard loop used in previously described embodiments may be used without modification and without a retainer, though this arrangement will be less effective in allowing and controlling ski flexation, and spreading out the flexation over a relatively large portion of the ski.

Figure 8:
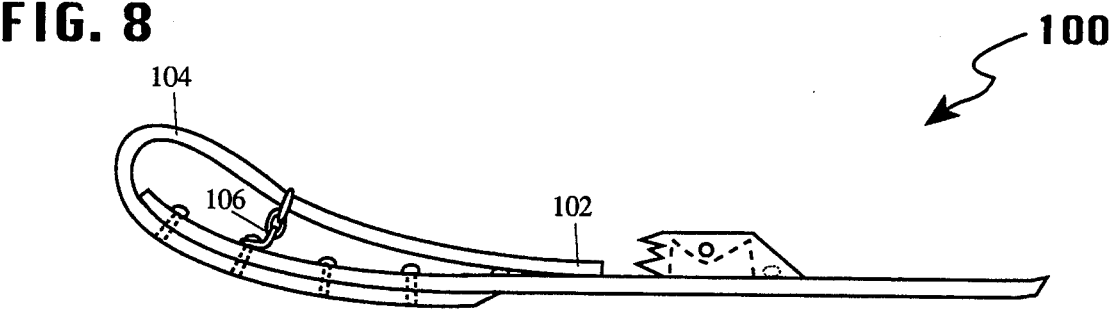
FIG. 8 is a side elevational view of a fifth example of a snowmobile ski according to the invention.
Figure 9:
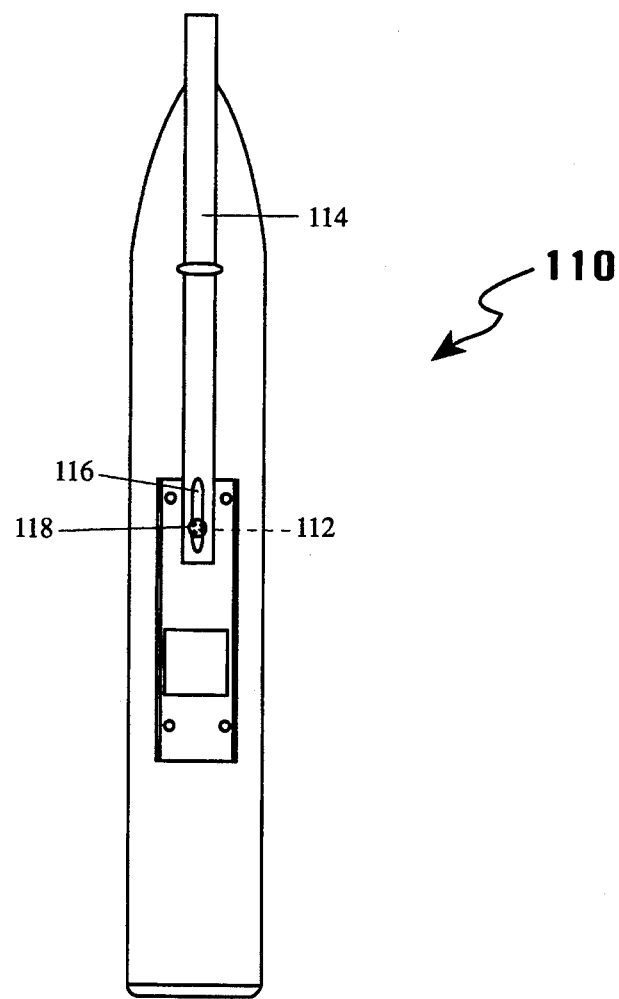
FIG. 9 is a top plan view of a sixth example of a snowmobile ski according to the invention.
Figure 10:
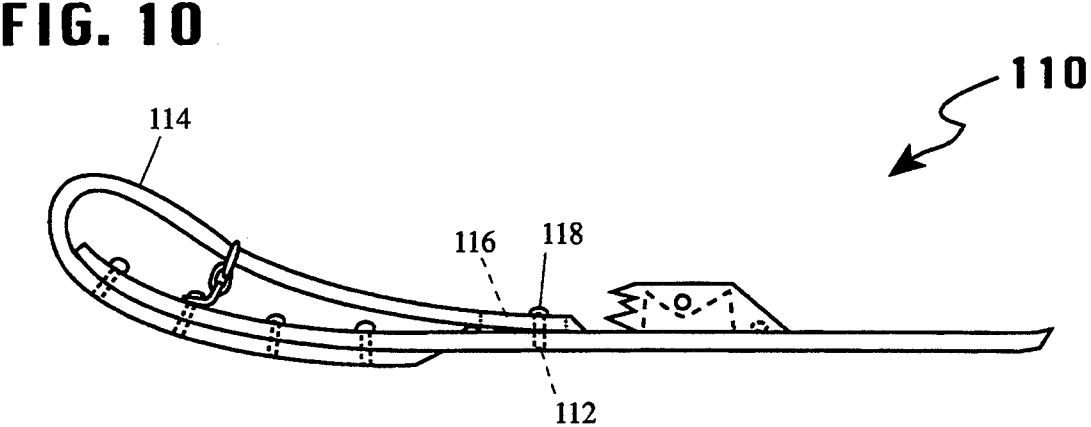
FIG. 10 is a side elevational view of the snowmobile ski of FIG. 9.

Referring now to FIG. 8, a fifth example of a ski 100 is shown which is the same in all respects to the ski 10 of FIGS. 1 to 4 except that it lacks a bracket to contain the end 102 of the loop 104, leaving the function of containing the loop and accommodating its sliding movement to the retainer 106. This arrangement may be desired through appropriate shaping of the loop 104 such that it presses firmly against the ski 100, minimizing or eliminating the need for a bracket. Of course, if this arrangement is used, limiting devices other than those illustrated in FIGS. 5 and 6 and accompanying disclosure will be used, which will be apparent to those skilled in the art.

Referring now to FIGS, 9 and 10, a sixth example of a ski 110 according to the invention is shown which is similar to the ski 90 shown in FIG. 7 except that instead of using a bracket to limit movement, a bolt 112 extends through the loop 114 in a slot 116 disposed lengthwise in the loop, except for the head 118 of the bolt, which extends above the loop and presses down upon it. In a preferred embodiment, the bolt 112 is located at approximately the location of the bracket shown in previously described embodiments. Though most prior art skis secure their loops to the ski at a more forward position, some secure the loop to the ski at this location. This embodiment allows forward and rearward movement of the loop similar to the bracket in previously described embodiments except that in the ski 110 the movement is allowed by the sliding of the slot 116 along the bolt 112 while the head 118 of the bolt simultaneously secures the loop 114 in position against the ski in sliding engagement. This embodiment may be a good choice for the manufacuture of less expensive skis since the manufacture and placement of a bracket is not required.

It is to be emphasized that the retainer/bracket and bolt/slot assemblies are not the only means of simultaneously limiting and allowing movement of the loop during flexation, but are set forth herein only as illustrative embodiments of the invention. Other means of accomplishing the functions of these and other structures described herein will be apparent to those skilled in the art. The described embodiments are only examples of apparatuses which may be constructed according to the invention; other apparatuses within the scope of the claims will be apparent to those skilled in the art in light of this disclosure. It will also be apparent that the apparatus described herein may be used not only with snowmobiles but with other vehicles as well.

I claim:

1. A snowmobile ski flexing apparatus for use with a flexible elongate ski having front and rear portions, the front portion being curved upwardly, comprising:
   a flexible elongate loop having first and second ends, the first end being attached to the front portion of the ski and extending upwardly and rearwardly toward the rear portion of the ski, then downwardly toward the ski such that the second end is disposed adjacent the ski;
   an attachment device mounted on the ski and operatively attaching the loop to the ski, the attachment device allowing the second end of the loop to move lengthwise relative to the ski; and the attachment device comprises an elongate retainer mounted at a first end to the ski, at a first attachment point, and at a second end to the loop, at a second attachment point.

2. The flexing apparatus of claim 1 wherein the retainer is flexible.

3. The flexing apparatus of claim 1 wherein the first end of the retainer is pivotally connected to the ski at the first attachment point.

4. The flexing apparatus of claim 1 wherein the second end of the retainer is movably connected to the loop at the second attachment point.

5. The flexing apparatus of claim 1 wherein the second end of the retainer is slidably attached to the loop at the second attachment point whereby the loop is slidably movable relative to the retainer.

6. The flexing apparatus of claim 1 wherein the retainer is a chain.

7. The flexing apparatus of claim 1 wherein the retainer comprises a roller means the loop at the second attachment point to accommodate movement of the loop.

8. The flexing apparatus of claim 1 wherein the attachment device comprises a bracket secured to the ski which retains the second end of the loop in movable engagement.

9. The flexing apparatus of claim 8 further comprising a metal attachment plate disposed on the ski for attachment to the snowmobile and wherein the bracket comprises a three-sided metal plate secured to the attachment plate which retains the second end of the loop in sliding engagement.

10. The flexing apparatus of claim 9 wherein the bracket has open forward and rearward ends such that the second end of the loop can move freely through the bracket.

11. The flexing apparatus of claim 9 wherein the bracket has an open forward end and a closed rearward end such that the second end of the loop is limited in rearward movement by abutment against the closed rearward end of the bracket.

12. The flexing apparatus of claim 1 further comprising means for limiting the lengthwise movement of the loop relative to the ski.

13. The flexing apparatus of claim 10 wherein the second end of the loop protrudes through the bracket and further comprising a stop block disposed on the second end of the loop whereby the loop is limited in forward movement by the abutment of the stop block against the bracket.

14. The flexing apparatus of claim 1 wherein the loop extends beneath the front portion of the ski and is securely attached thereto.

15. A flexible snowmobile ski apparatus comprising:
an elongate, flexible, planar snowmobile ski having an upwardly curved forward portion and a rearward portion;
an attachment plate disposed on the ski approximately at a ski midpoint for attachment of the ski to a snowmobile;
an elongate, flexible loop having a first end secured to an underside of the forward portion of the ski and curving around and over a forward end of the ski and back down to a second end disposed adjacent the attachment plate;
an elongate flexible retainer pivotally attached at a first end to the forward portion of the ski and slidably attached at a second end to the loop;
a metal bracket having at least an open front end mounted on the attachment plate and slidably engaging the loop near the second end thereof such that the loop slides lengthwise relative to the ski when the ski is flexed.

16. The ski apparatus of claim 15 wherein the ski and loop are constructed of UHMW plastic, the ski being approximately one-half inch thick and the loop being approximately one-half inch thick.

17. The ski apparatus of claim 15 wherein the retainer is a chain.

18. The ski apparatus of claim 15 further comprising a backstop disposed at the rear end of the bracket such that the loop is limited in rearward movement upon engagement of the loop rear end with the backstop.

19. The ski apparatus of claim 15 further comprising a stop block disposed on the second end of the loop such that the loop is limited in forward movement upon engagement during flexing with the bracket.

* * * * *